United States Patent [19]
Westerberg et al.

[11] Patent Number: 5,954,980
[45] Date of Patent: *Sep. 21, 1999

[54] APPARATUS AND METHOD FOR UNIFORMLY COOKING FOOD WITH ASYMMETRICALLY PLACED RADIANT ENERGY SOURCES

[75] Inventors: Eugene R. Westerberg, Palo Alto; William H. Sehestedt, Santa Clara, both of Calif.

[73] Assignee: Quadlux, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/396,254

[22] Filed: Feb. 28, 1995

Related U.S. Application Data

[63] Continuation of application No. 08/065,802, May 21, 1993, abandoned, which is a continuation-in-part of application No. 07/738,207, Jul. 30, 1991, abandoned, which is a continuation-in-part of application No. 07/350,024, May 12, 1989, Pat. No. 5,036,179, which is a continuation-in-part of application No. 07/195,967, May 19, 1988, abandoned.

[51] Int. Cl.[6] .............................. A23L 1/01; A21B 2/00; F27B 9/06; F27B 9/16
[52] U.S. Cl. ..................... 219/411; 219/388; 219/405; 392/416
[58] Field of Search ..................... 219/405, 411, 219/391, 400, 388; 392/416, 418; 126/273 R, 276; 426/523, 241–243, 248; 99/483, 451, 467

[56] References Cited

U.S. PATENT DOCUMENTS

| | | | |
|---|---|---|---|
| 793,424 | 6/1905 | Custer | 219/405 |
| 2,559,249 | 7/1951 | Hudson | 392/416 |
| 2,864,932 | 12/1958 | Forrer . | |
| 3,037,443 | 6/1962 | Newkirk et al. | 99/332 |
| 3,304,406 | 2/1967 | King | 219/411 |
| 3,313,917 | 4/1967 | Ditzler et al. | 219/400 |
| 3,342,977 | 9/1967 | Anderson | 219/405 |
| 3,569,656 | 3/1971 | White et al. . | |
| 3,621,200 | 11/1971 | Watts, Jr. | 219/553 |

(List continued on next page.)

FOREIGN PATENT DOCUMENTS

| | | | |
|---|---|---|---|
| 0215617 | 9/1986 | European Pat. Off. . | |
| 0226407 | 6/1987 | European Pat. Off. . | |
| 0 332 081 | 9/1989 | European Pat. Off. . | |
| 25 46 106 | 4/1977 | Germany . | |
| 3503648 | 4/1986 | Germany . | |
| 59-47302 | 3/1984 | Japan . | |
| 60-37116 | 2/1985 | Japan | 219/405 |
| 1-154483 | 6/1989 | Japan | 219/405 |

(List continued on next page.)

OTHER PUBLICATIONS

Sato et al, "Effects of Radiative Characteristics of Heaters on Crust Formation and Coloring Processes of Food Surface", Nippon Shokuhin Kagaku Kogaku Kaishi, V. 24, No. 9, (1995).

Fostoria Corporation, "Heat Processing with Infrared", Feb., 1962, pp. 1–7.

Summer, W. Dr., "Ultra–Violet and Infra–Red Engineering", 1962, pp. 102–112.

Beggs, E.W., "Quicker Drying with Lamps", Jul., 1939, vol. 97, No. 7, pp. 88–89.

Harold McGee, Book, "On Food and Cooking", Charles Schribner's Sons, New York,1984, Chapter 14, pp. 608–624.

*Primary Examiner*—Teresa J. Walberg
*Assistant Examiner*—J. Pelham
*Attorney, Agent, or Firm*—Limbach & Limbach L.L.P.

[57] ABSTRACT

An oven for cooking with light having wavelengths in the visible, near visible, and infra-red spectral ranges uses one or more quartz halogen tungsten lamps or quartz arc bulbs positioned above and below the food item. Uniform cooking of the food item is achieved by positioning the lamps asymmetrically with respect to the midline of the oven and by rotating the food item on a rack during the cooking cycle.

12 Claims, 5 Drawing Sheets

U.S. PATENT DOCUMENTS

| | | | |
|---|---|---|---|
| 3,688,084 | 8/1972 | Charneski | 219/405 |
| 3,828,163 | 8/1974 | Amagami et al. | 219/413 |
| 4,410,779 | 10/1983 | Weiss . | |
| 4,463,238 | 7/1984 | Tanabe . | |
| 4,481,405 | 11/1984 | Malick | 219/405 |
| 4,486,639 | 12/1984 | Mittelsteadt . | |
| 4,516,486 | 5/1985 | Burkhart | 99/388 |
| 4,554,437 | 11/1985 | Wagner et al. | 219/388 |
| 4,575,616 | 3/1986 | Bergendal | 219/405 |
| 4,687,895 | 8/1987 | Chitre et al. . | |
| 4,700,051 | 10/1987 | Goessler et al. | 219/464 |
| 4,731,251 | 3/1988 | Jovanovic | 426/243 |
| 4,761,529 | 8/1988 | Tsisios . | |
| 5,045,671 | 9/1991 | Kanaya et al. | 219/411 |
| 5,378,872 | 1/1995 | Jovanovic | 219/388 |

FOREIGN PATENT DOCUMENTS

| | | |
|---|---|---|
| 1273023 | 5/1972 | United Kingdom . |
| 2132060 | 8/1983 | United Kingdom . |
| 2132060 | 6/1984 | United Kingdom . |
| 2152790 | 8/1985 | United Kingdom . |
| 2 180 637 | 4/1987 | United Kingdom . |
| 2245136 | 1/1992 | United Kingdom . |

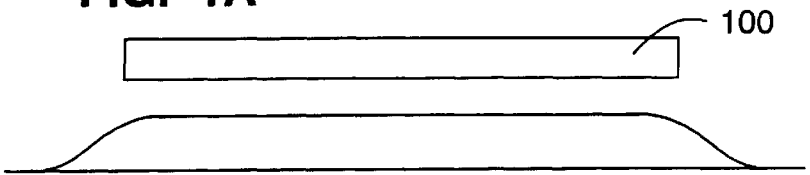
FIG. 1A
FIG. 1B
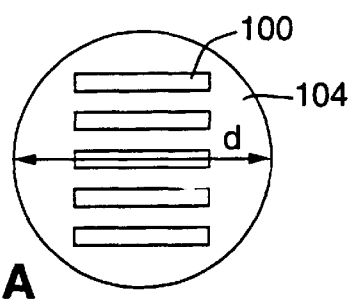
FIG. 2A
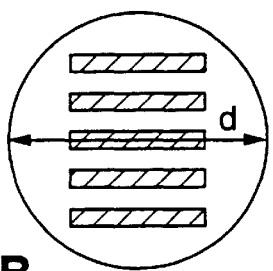
FIG. 2B
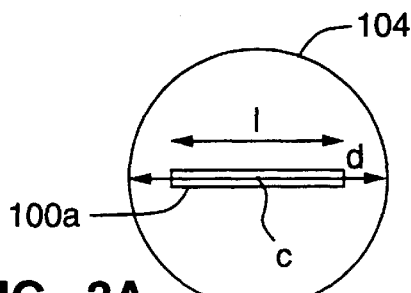
FIG. 3A
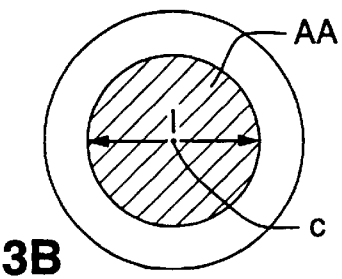
FIG. 3B
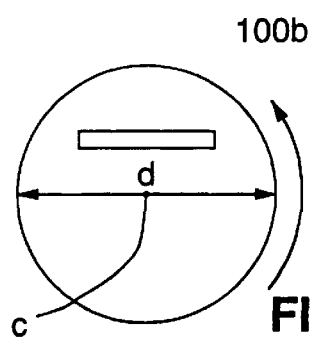
FIG. 4A
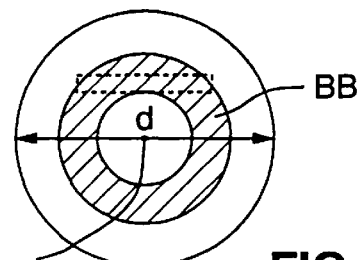
FIG. 4B
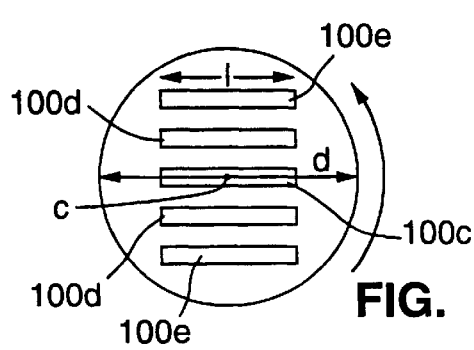
FIG. 5A
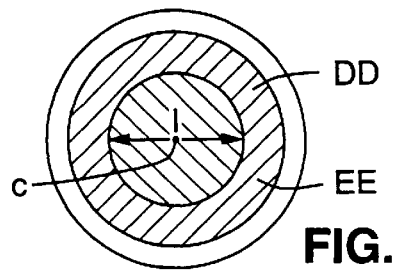
FIG. 5B

5,954,980

APPARATUS AND METHOD FOR UNIFORMLY COOKING FOOD WITH ASYMMETRICALLY PLACED RADIANT ENERGY SOURCES

RELATED APPLICATIONS

This is a continuation of application Ser. No. 08/065,802 filed on May 21, 1993, now abandoned, which is a continuation-in-part of application Ser. No. 07/738,207, filed Jul. 30, 1991, now abandoned, which was a continuation-in-part of application Ser. No. 07/350,024, filed May 12, 1989, now U.S. Pat. No. 5,036,179 which was in turn a continuation-in-part of application Ser. No. 07/195,967, filed May 19, 1988, now abandoned.

FIELD OF THE INVENTION

This invention relates to the field of radiant source ovens. More particularly, this invention relates to ovens having a rotating rack and an array of linear radiation sources typically shorter than the transverse dimension of the cooking location and which are arranged to maximize uniform cooking of a food item.

BACKGROUND OF THE INVENTION

Ovens following the present invention and having linear sources of visible and infra-red radiant energy are disclosed and described in U.S. Pat. No. 5,036,179 and U.S. patent application Ser. No. 07/738,207 which are incorporated herein by reference. These ovens provide high-speed, high-quality cooking and baking of food items by impinging high-intensity visible, near-visible, and infrared radiations onto a food item. The ovens cook the food items within the short periods of time normally found in microwave cooking while maintaining the browning of infrared cooking and the quality of conduction-convection cooking. When food is exposed to a sufficiently intense source of visible, near-visible, and infrared radiation, the food absorbs low levels of visible and near-visible radiation, thereby allowing the energy to penetrate the foodstuff and heat it deeply. The longer infrared radiation does not penetrate deeply but acts as an effective browning agent.

Ordinarily, the source of the visible, near-visible and infrared radiation for this invention is in excess of two elongated quartz-halogen tungsten lamps, or equivalent means such as quartz arc lamps. Typical quartz-halogen lamps of this type operate at 3000 degrees Kelvin and convert electrical energy into black body radiation having a range of wavelengths from 0.4 $\mu$m to 4.5 $\mu$m with a peak intensity at 0.965 $\mu$m. Each lamp can generally provide about between 1.5 and 2 kW of radiant energy with a significant portion of the energy in the visible light spectrum.

The ovens can use a plurality of these lamps or an array of several lamps either operated in unison or selectively operated in varying combinations as necessary for the particular food item sought to be cooked. These radiation sources are ordinarily positioned above and below the food item. The walls of the surrounding food chamber are preferably made from highly reflective surfaces. The visible and infrared waves from the radiation sources impinge directly on the food item and are also reflected off the reflected surfaces and onto the food item from many angles. This reflecting action improves uniformity of cooking.

The intensity of radiant energy received by an object decreases with the increase in distance between the object and the radiant energy source. Despite the improved uniformity of cooking provided by the reflective interior surfaces of the oven, the areas of the food item that are positioned directly above or below the radiation sources receive more direct energy and therefore cook more quickly than their surrounding areas.

FIGS. 1A and 1B show an end view and a longitudinal side view, respectively, of a single linear radiation source 100 and further show the distributions of light intensity measured at the surface of a food item positioned underneath the radiation source. As shown in both figures, the regions of the food item which are positioned directly below the light source are exposed to the maximum intensity received by the food item, while the surrounding areas are exposed to significantly lower intensities.

FIG. 2A shows a lamp configuration under which a food item 104 is cooked under an array of elongate radiation sources 100 that are shorter than the length of the food item and that are arranged in parallel. The food item is cooked to the desired degree in the regions of the food item that are close to the lamps, designated by shading in FIG. 2B. The unshaded regions remain uncooked or undercooked.

Rotating the food item relative to the stationary radiation sources also yields a non-uniformly cooked end product. FIG. 3A shows a circular food surface 104, such as a pizza, positioned underneath a single radiation source 100a having a length l. The radiation source is parallel to and shorter than diameter d of the pizza. Referring to FIG. 3B, when the pizza is rotated about its center C, the radiation source cooks a circular region AA having diameter equal to the length l of the radiation source 100a. Moreover, cooked portion AA is itself non-uniformly cooked: the regions that are closer to the center C spend more time under the radiation source and therefore are cooked more thoroughly than those regions that are further away from it.

As shown in FIGS. 4A and 4B, positioning a single source 100b parallel to a diameter d of the rotating pizza will cook only an annular path BB, leaving the remainder of the pizza uncooked.

Combining the concepts described with respect to FIGS. 3B and 4B partially solves the problem of non-uniform cooking. FIG. 5A shows five equally spaced radiation sources 100c, 100d, 100e fixed over a pizza 104 which is positioned on a rotating rack (not shown). The sources are equal in length, and their length l is less than the diameter d of the pizza 104. The center source 110c lies above the diameter of the pizza, and the outer radiation sources are positioned parallel to it.

When the pizza is rotated about the center C, the energy generated by radiation sources 100d and 100e creates partially cooked annular paths similar to region BB in FIG. 4B. These paths are also exposed by the center source 100c, although their exposure time is minimal as explained with respect to FIG. 3B.

Designing an oven having radiation sources that extend beyond the outer boundaries of the food location in the oven would allow uniform cooking of the food region even where the sources are arranged as in FIG. 5A. However, there are limits to the size of radiation sources that can be manufactured for use in ovens of the present type, making it often impractical to utilize radiation sources that are longer than the area of food sought to be cooked. To attempt to do so would unnecessarily limit the size of the food items which could be cooked using combined visible and infra-red radiation. A lamp configuration is therefore needed that will provide uniform cooking even where the size of the cooking surface exceeds the dimensions of the lamps.

SUMMARY OF THE INVENTION

The present invention utilizes an array of light sources asymmetrically placed with respect to the diameter of a rotating rack. The lamps have a length that is shorter than the width or diameter of a cooking area. Rotation of a food item beneath the asymmetrically placed lamps causes substantially all of the food surface to be exposed to substantially the same radiation for a substantially equal period of time and therefore results in substantially uniform cooking of the food item.

DESCRIPTION OF THE DRAWINGS

FIGS. 1A and 1B are an end view and a side view, respectively, of a lamp and with its associated intensity distribution measured at the surface of a food item positioned underneath the lamp.

FIGS. 2A through 5B are schematic representations showing four different lamp arrays and the regions of a food item that are cooked by each of the respective arrays.

DETAILED DESCRIPTION OF THE INVENTION

The present invention is comprised generally of an oven 10, a rotating circular rack 31, and upper and lower arrays 18, 16 of radiant energy sources, or lamps.

Figure 6:
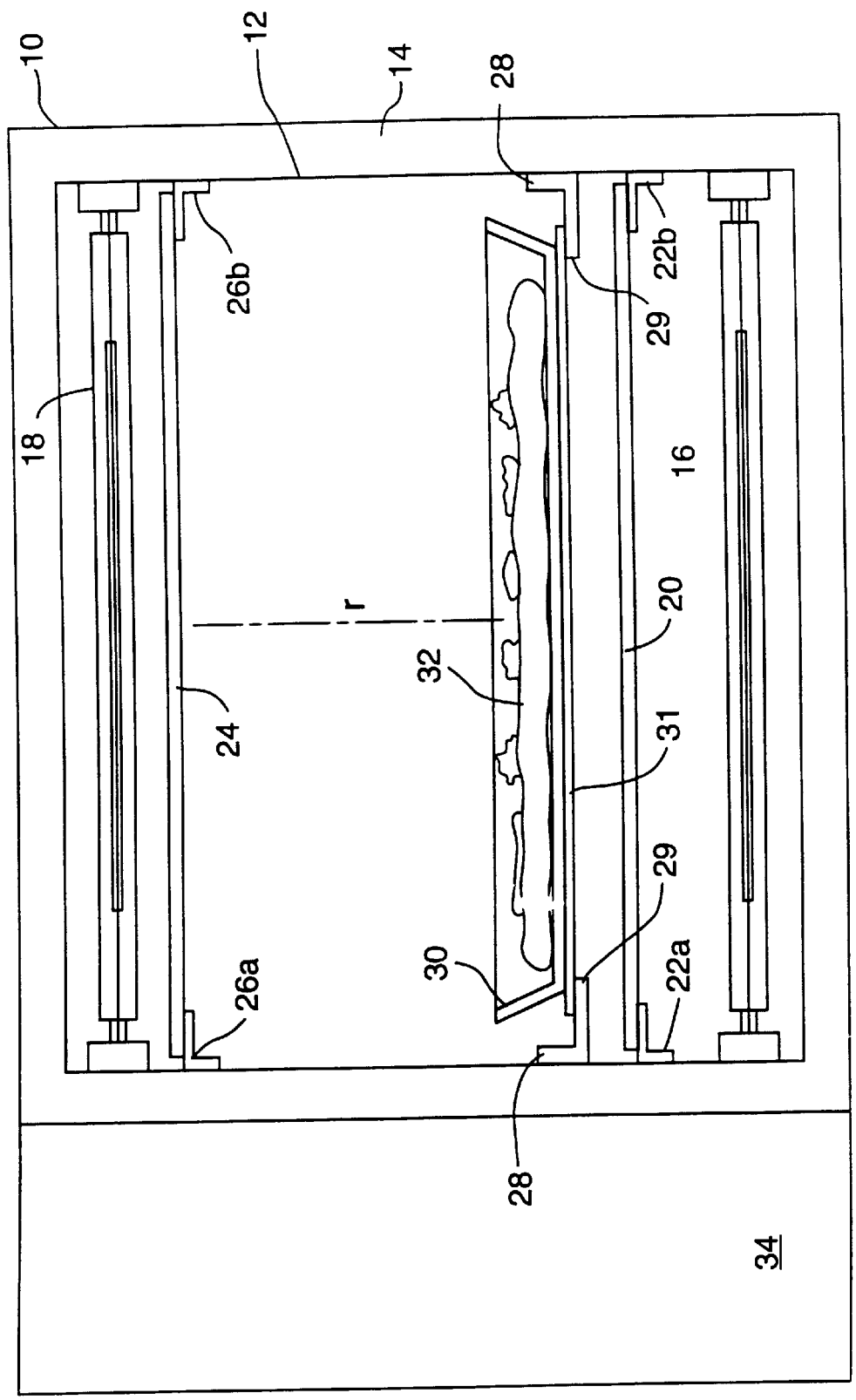
FIG. 6 is a front section view of an oven according to the present invention.

FIG. 6 is a front section view of the oven. The energy for cooking is supplied by lower heating lamps 16 and upper radiation heating lamps 18. The lamps are preferably quartz-halogen tungsten lamps which are capable of producing approximately 2 kW of radiant energy with a significant portion of the light energy in the visible light spectrum. When illuminated, the lighted portion of a preferred lamp has a length of approximately 10 inches.

The inner surface of the inner wall 12 is preferably a highly polished metal, such as aluminum or stainless steel, which is very reflective to the wide spectrum of wavelengths from the radiant lamps. The oven has a door 40 (FIG. 7) which also has a reflective inner surface.

Two radiation transparent plates 20 and 24 are used to isolate the cooking chamber from the radiant lamps, making the oven easier to clean. These plates can be formed from materials, such as high quality heat-resistant glasses and ceramics that are transparent to visible, non-visible and infrared radiations. The lower transparent plate 20 is supported by brackets 22a and 22b and is positioned above the lower lamps 16. The upper transparent plate 24 is supported by brackets 26a and 26b and is positioned below upper lamps 18.

Figure 8A:
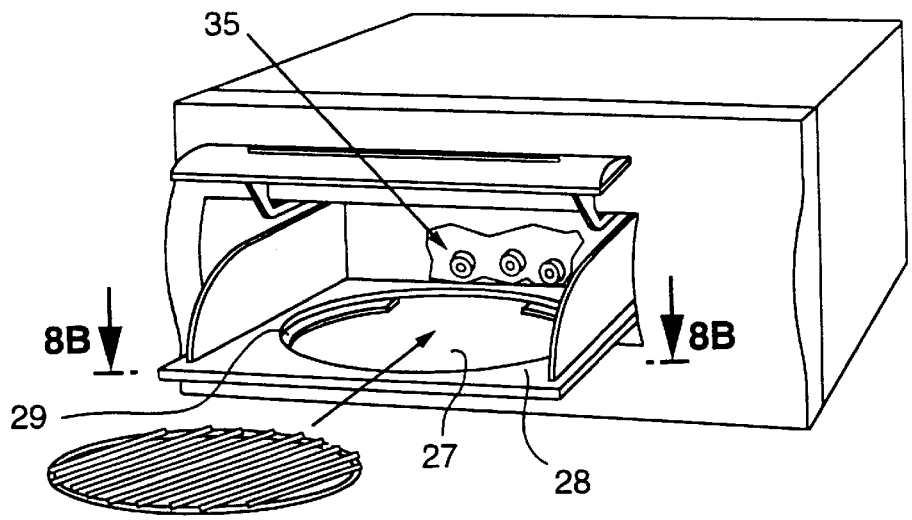
FIGS. 8A, 8B, and 8C are a perspective view, a top plan view, and a side elevational view, respectively, showing the preferred means for rotating the rack of the present invention.
Figure 8B:
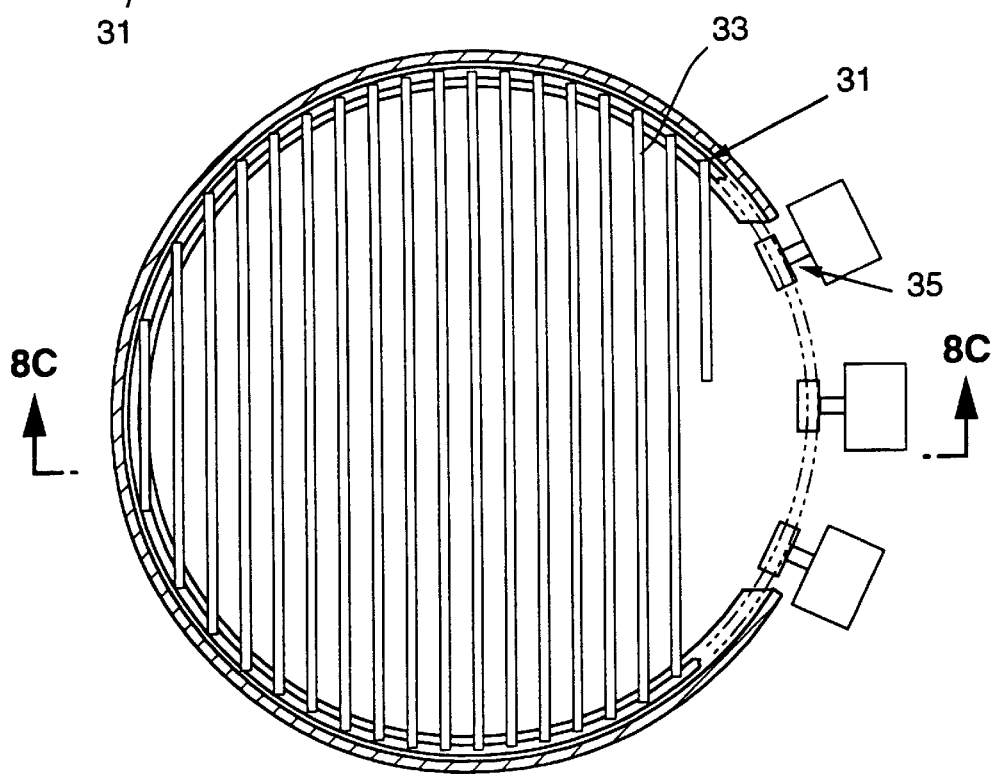
Figure 8C:
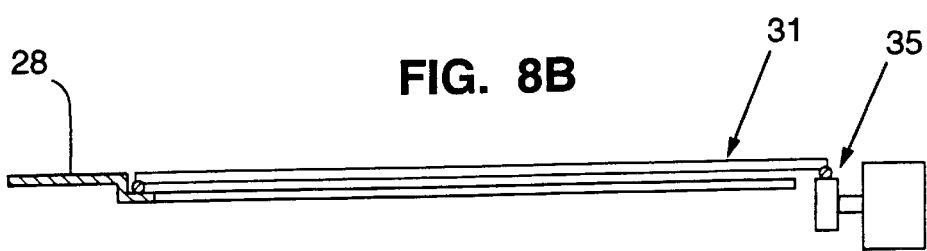

Shelf 28 is mounted between the transparent plates inside the oven chamber. As shown in FIG. 8A, the shelf 28 has a circular cut out portion 27 which is lined at its perimeter by a track 29. A circular rack 31, comprised of a grid of small diameter metallic bars 33, rests loosely on the track 29 as shown in FIG. 8B. During use, a heat-resistant glass dish which holds the food is placed on top of the rack for cooking. The rack has a diameter of preferably 12 to 14 inches and is capable of rotating around an axis of rotation, designated r. Rollers 35 are positioned such that when one of them is rotated by a motor (not shown), they engage with the perimeter portion of the rack, causing the rack to rotate within the track 29.

Figure 7:
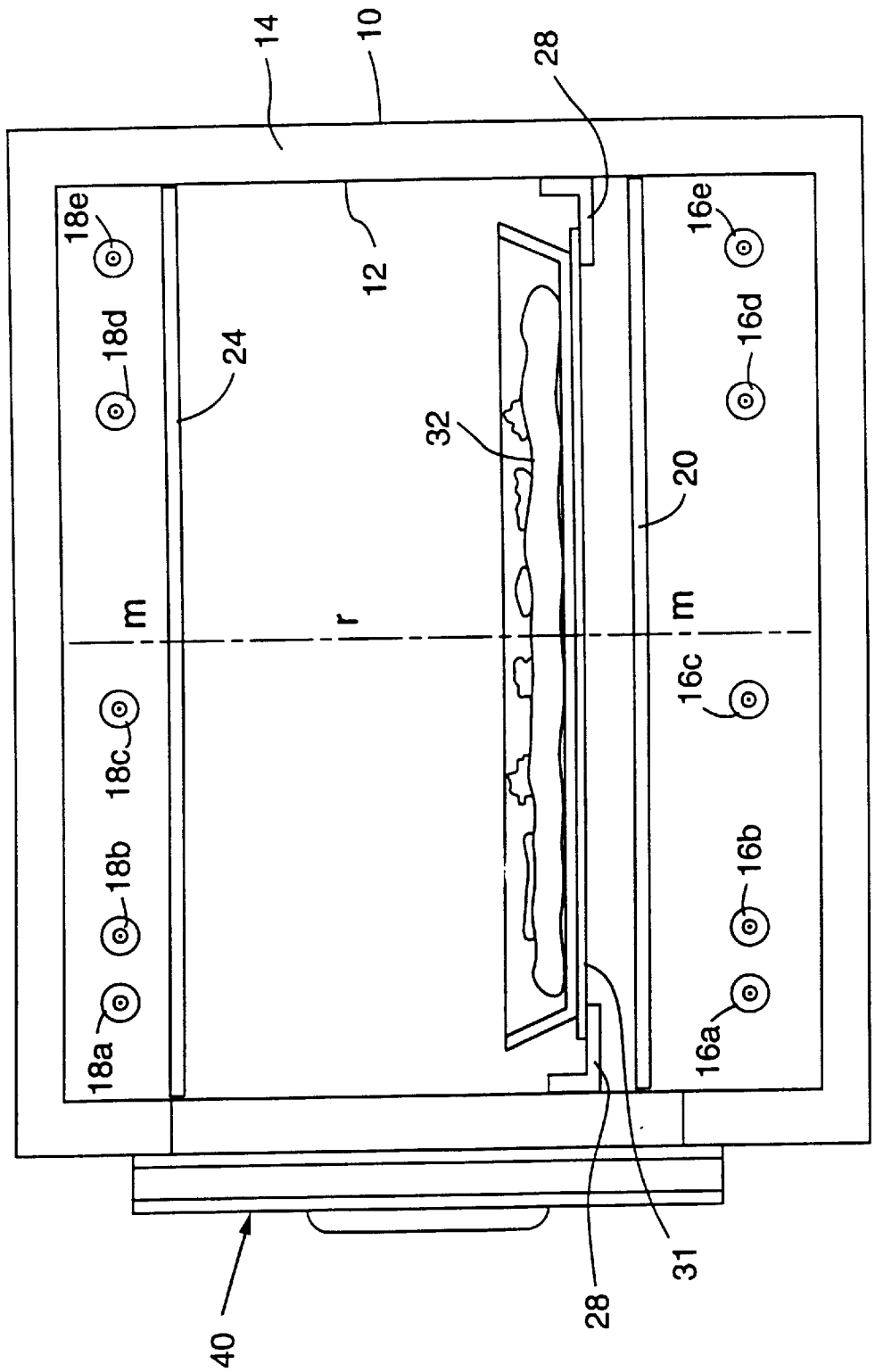
FIG. 7 is a side section view of a preferred embodiment of an oven according to the present invention.

FIG. 7 shows a side section of the preferred oven according to the present invention. In the preferred embodiment, there are 5 lower lamps 16a through 16e and 5 upper lamps 18a though 18e. By appropriately selecting the lateral spacing between the lamps relative to the food, even cooking can be achieved over the entire surface. This is accomplished by rotating the food item using the rack 31 and by arranging the lamps such that during the cooking cycle all regions of the food surface receive equivalent amounts of energy from the lamps. As described above, this requires arranging the lamps such that all regions of the food surface are positioned directly underneath a lamp for substantially equivalent periods of time.

This desired result is most readily accomplished by positioning the lamps asymmetrically with respect to the midline m of the lamp array. Asymmetry is achieved by positioning unequal numbers of lamps on either side of the midline, and/or by positioning the lamps at unequal distances from the midline such that the lamp arrangements on either side of the midline are not "mirror images" of one another.

Alternatively, an equal number of equally spaced lamps may be positioned on either side of the midline, and asymmetrical configurations of lamps may be selectively illuminated depending on the size and of the food item sought to be cooked and its ability to absorb visible light. Because different food types will be capable of absorbing different amounts of energy, a configuration of this type would be particularly helpful when, for example, a dish containing various foods is positioned on the rack for cooking.

Figure 9:
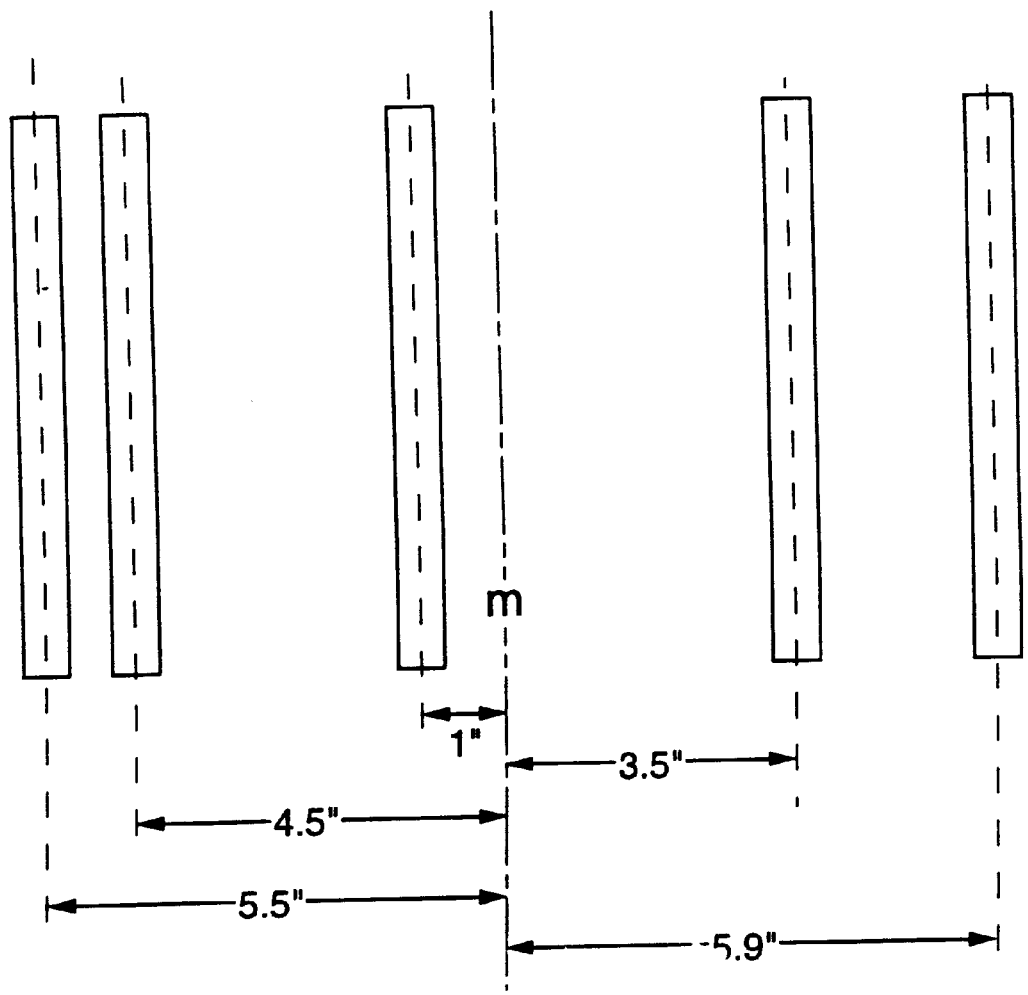
FIG. 9 is a schematic representation of the preferred lamp configuration according to the present invention.

A top view of the preferred lamp array is shown in FIG. 9. In the preferred oven, the lamps in the upper and lower arrays are identically arranged. Positioning of the lamps will be described with respect to a midline m which bisects the array and which intersects the axis of rotation r (FIGS. 6 and 7) of the rack 31. Three of the lamps, 18a, 18b, and 18c, are positioned on one side of the midline and are respectively 5.5 inches, 4.5 inches and 1 inch from the midline. The remaining two lamps, 18d, 18e, are positioned on the opposite side of the midline and are positioned 3.5 inches and 5.9 inches from the midline, respectively. The lamps are positioned approximately 3 inches above the rack 31. The lateral positions of the lamps from the midline can be varied plus or minus one-eighth inch from their stated positions while still maintaining substantially uniform radiation across the food location.

Using the preferred dimensions given above, the lamp configuration may be reduced to a mathematical expression which will yield alternative lamp configurations that will likewise achieve uniform cooking. Assuming the diameter of the food location "d" is 12 inches and the lamp filament length "L" is 10 inches as stated above, it can be seen that L=($10/12$)×d. A general formulation of the distance of each lamp from the midline "m" may be calculated in terms of L as follows:

$D_n = x_n L$, where $D_n$ is the distance from the midline of the lamp having reference numeral "n" in FIG. 7. For example, for lamps 18c and 18b the respective multiplier $x_{18c}$ and $x_{18b}$, may be calculated using the distances used in the preferred embodiment:

$$D_{18c}=1=x_{18c}(10)$$

$$x_{18c}=1/10$$

$$D_{18b}=4.5=x_{18b}(10)$$

$$x_{18b}=4.5/10$$

The multipliers for the all of the lamps 18a through 18d, which were calculated in the manner shown above, are included in the following chart:

| Lamp No. | $x_n$ |
|---|---|
| 18a | 5.5/10 |
| 18b | 4.5/10 |
| 18c | 1/10 |
| 18d | 3.5/100 |
| 18e | 5.9/10 |

In similar fashion, the distance $D_n$ between the midline "m" and each of the respective lamps may be expressed in terms of the relationship (L/d) (where L/d is approximately between 10/12 and 1) of the length "L" of the lamp filaments to the diameter "d" of the food location:

$$D_n=y_n(L/d)$$

The multiplier $y_n$ for each of the respective lamps is thus calculated using the preferred distances between each of those lamps and the midline $$D_{18c}=1=y_{18c}(10/12)$$

$$y_{18c}=12/10=1.2$$

$$D_{18b}=4.5=y_{18b}(10/12)$$

$$y_{18b}=5/4$$

The multipliers for the all of the lamps 18a through 18d, which were calculated in the manner shown above, are included in the following chart:

| Lamp No. | $y_n$ |
|---|---|
| 18a | 6.6 |
| 18b | 5.4 |
| 18c | 1.2 |
| 18d | 4.2 |
| 18e | 7.08 |

In the embodiment of FIG. 7 the positions of the lower lamps 16a–16e are the same as the upper lamps 18a–18e but obviously the position of one of these two sets can be reversed with respect to the other.

To use the oven of the present invention, the food item sought to be cooked is positioned on the rack 31 and the door 40 is closed. The motor is switched on, causing the roller to engage and rotate the rack. The lamps are illuminated for a predetermined cooking time, causing the food item to cook uniformly.

The present invention is described in relation to the preferred embodiment but is limited only in terms of the language of the appended claims.

We claim:

1. An oven for cooking a food item, the oven comprising:
a food support rotatable about an axis of rotation, the food support having a cooking area thereon which has a widest dimension extending in a direction perpendicular to the axis of rotation;
a radiation source for directing radiant energy having a significant portion of the radiant energy in the visible and near visible light range of the electromagnetic spectrum onto the food support, wherein the cooking area is defined as any portion of the food support that directly faces the radiation source at least at some point while the oven cooks a food item supported by the food support; and
the radiation source including an array of elongate first lamps each having an effective length which is shorter than the widest dimension of the cooking area and a longitudinal axis parallel to the longitudinal axes of the other first lamps, the first lamps positioned facing the food support such that the perpendicular distance between each first lamp and a plane containing the axis of rotation and extending parallel to the longitudinal axes of the first lamps differs from the distance between the plane and the other first lamps;
wherein the food support receives a desired amount of radiant energy from the radiation source throughout the entire cooking area for uniform cooking when the food support is rotated.

2. The oven of claim 1 wherein the first lamps are positioned above the food support and wherein the radiation source further comprises an array of second lamps each having an effective length which is shorter than the widest dimension of the cooking area and a longitudinal axis parallel to the longitudinal axes of the other second lamps and to the plane, the second lamps positioned below the food support such that the perpendicular distance between each second lamp and the plane differs from the distance between the plane and the other second lamps.

3. An oven for cooking a food item, the oven comprising:
a food support rotatable about an axis of rotation, the food support having a cooking area thereon which has a widest dimension extending in a direction perpendicular to the axis of rotation; and
a radiation source for directing radiant energy having a significant portion of the radiant energy in the visible and near visible light range of the electromagnetic spectrum onto the food support, wherein the cooking area is defined as any portion of the food support that directly faces the radiation source at least at some point while the oven cooks a food item supported by the food support, the radiation source comprising:
an array of first lamps, each first lamp having a longitudinal axis parallel to the longitudinal axes of the other first lamps, the first lamps facing the food support such that the perpendicular distance between each first lamp and a plane containing the axis of rotation and extending parallel to the longitudinal axes of the first lamps differs from the distance between the plane and the other first lamps, wherein all of the first lamps are positioned to one side of the plane, and
an array of second lamps, each second lamp having a longitudinal axis parallel to the longitudinal axes of the other second lamps and to the plane, the second lamps facing the food support such that the perpendicular distance between each second lamp and the plane differs from that of the other second lamps, each of the first and second lamps having an effective length which is shorter than the widest dimension of the cooking area;

wherein the food support receives a desired amount of radiant energy from the radiation source throughout the entire cooking area for uniform cooking when the food support is rotated.

4. The oven of claim 3, wherein all of the first lamps are positioned to one side of the plane, and wherein all of the second lamps are positioned to a side of the plane opposite to the side on which the first lamps are located.

5. The oven of claim 3 wherein the array of first lamps includes at least one more lamp than the array of second lamps.

6. The oven of claim 3, wherein the first lamps are positioned above the food support and the second lamps are positioned below the food support.

7. The oven of claim 6 wherein the radiation source further comprises:

an array of third lamps, each third lamp having a longitudinal axis parallel to the plane, the third lamps positioned below the food support such that the perpendicular distance between each third lamp and the plane differs from that of the other third lamps, wherein all of the third lamps are positioned on the same side of the plane as the first lamps, and an array of fourth lamps, each fourth lamp having a longitudinal axis parallel to the plane, the fourth lamps positioned above the food support such that the perpendicular distance between each fourth lamp and the plane differs from that of the other fourth lamps, wherein all of the fourth lamps are positioned on the same side of the plane as the second lamps, and wherein each third and fourth lamp has an effective length which is shorter than the widest dimension of the cooking area.

8. A method of cooking a food item positioned on a food support having an axis of rotation and a cooking area thereon with a widest dimension extending in a direction perpendicular to the axis of rotation, the method comprising the steps of:

directing radiant energy having a significant portion of the radiant energy in the visible and near visible light range of the electromagnetic spectrum onto the food item positioned on the cooking area;

initiating said radiant energy from a plurality of spaced apart lamps having substantially parallel longitudinal axes, the longitudinal axes parallel to a plane containing the axis of rotation of the food support, the lamps spaced different distances from said plane and having effective lengths which are shorter than the widest dimension of the cooking area, wherein the cooking area is defined as any portion of the food support that directly faces at least one of the plurality of spaced apart lamps at least at some point while the oven cooks a food item supported by the food support; and rotating the food support about the axis of rotation, wherein the food support receives a desired amount of radiant energy from the radiation source throughout the entire cooking area for uniform cooking.

9. The method of claim 8 wherein the initiating step includes the steps of:

initiating a first portion of said radiant energy from a first array of a number N of spaced apart first lamps having substantially parallel longitudinal axes, the longitudinal axes parallel to the plane containing the axis of rotation of the food support, the first lamps positioned on one side of the plane and spaced different distances from said plane; and initiating a second portion of said radiant energy from a second array of a number more than N of spaced apart second lamps having substantially parallel longitudinal axes, the longitudinal axes parallel to the plane containing the axis of rotation of the food support, the second lamps spaced different distances from said plane, all of the second lamps positioned to a side of the plane opposite to the side on which the first lamps are located, wherein each first and second lamp has an effective length which is shorter than the widest dimension of the cooking area, and wherein the cooking area includes any portion of the food support that directly faces at least one of the first and second lamps at least at some point while the oven cooks a food item supported by the food support.

10. The method of claim 8 wherein the initiating step includes the steps of:

initiating a first portion of said radiant energy from a first array of a number N of spaced apart first lamps having substantially parallel longitudinal axes, the longitudinal axes parallel to the plane containing the axis of rotation of the food support, the first lamps positioned above the food support and spaced different distances from said plane; and initiating a second portion of said radiant energy from a second array of a number more than N of spaced apart second lamps positioned below the food support, the second lamps having substantially parallel longitudinal axes, the longitudinal axes parallel to the plane containing the axis of rotation of the food support, the second lamps spaced different distances from said plane, wherein each first and second lamp has an effective length which is shorter than the widest dimension of the cooking area, and wherein the cooking area includes any portion of the food support that directly faces at least one of the first and second lamps at least at some point while the oven cooks a food item supported by the food support.

11. An oven for cooking a food item, the oven comprising:

a food support rotatable about an axis of rotation, the food support having edges and a widest dimension d extension between the edges in a direction perpendicular to the axis of rotation;

an array of elongate lamps for directing radiant energy having a significant portion of the radiant energy in the visible and near visible light range of the electromagnetic spectrum onto the food support, each lamp having a filament length L of approximately $^{10}/_{12}d$ or greater, but less than d, each lamp further having a longitudinal axis parallel to the longitudinal axes of the other lamps, the array including;

a first lamp positioned above the food support such that the perpendicular distance between the first lamp and a plane containing the axis of rotation and extending parallel to the longitudinal axes of the lamps is substantially equal to $^{1}/_{10}L$, a second lamp positioned above the food support such that the perpendicular distance between the second lamp and the plane is substantially equal to $^{4.5}/_{10}L$, a third lamp positioned above the food support such that the perpendicular distance between the third lamp and the plane is substantially equal to $^{5.5}/_{10}L$, a fourth lamp positioned above the food support such that the perpendicular distance between the fourth lamp and the plane is substantially equal to 3.5L, and a fifth lamp positioned above the food support such that the perpendicular distance between the fourth lamp and the plane is substantially equal to $5.9/10$L;

said first, second and third lamps being located on one side of the plane and said fourth and fifth lamps being located on the side of the plane opposite said one side, and rotation means for rotating the food support about the axis of rotation.

12. An oven for cooking a food item, the oven comprising:

a food support rotatable about an axis of rotation, the food support having edges and a widest dimension d extending between the edges in a direction perpendicular to the axis of rotation r;

an array of elongate lamps for directing radiant energy having a significant portion of the radiant energy in the visible and near visible light range of the electromagnetic spectrum onto the food support, each lamp having a filament length L such that L/d is approximately between $10/12$ and 1, but less than 1, each lamp further having a longitudinal axis parallel to the longitudinal axes of the other lamps, the array including;

a first lamp positioned above the food support such that the perpendicular distance between the first lamp and a plane containing the axis of rotation and extending parallel to the longitudinal axes of the lamps is substantially equal to 1.2(L/D), a second lamp positioned above the food support such that the perpendicular distance between the second lamp and the plane is substantially equal to 5.4(L/d);

a third lamp positioned above the food support such that the perpendicular distance between the third lamp and the plane is substantially equal to 6.6(L/d);

a fourth lamp positioned above the food support such that the perpendicular distance between the fourth lamp and the plane is substantially equal to 4.2(L/d); and a fifth lamp positioned above the food support such that the perpendicular distance between the fourth lamp and the plane is substantially equal to 7.08(L/d);

said first, second and third lamps being located on one side of the plane and said fourth and fifth lamps being located on the side of the plane opposite said one side; and rotation means for rotating the food support about the axis of rotation.

* * * * *